Sept. 23, 1941.       C. W. PARKER       2,256,469
DUAL TIRE INFLATOR DEVICE
Filed Sept. 1, 1938        2 Sheets-Sheet 1
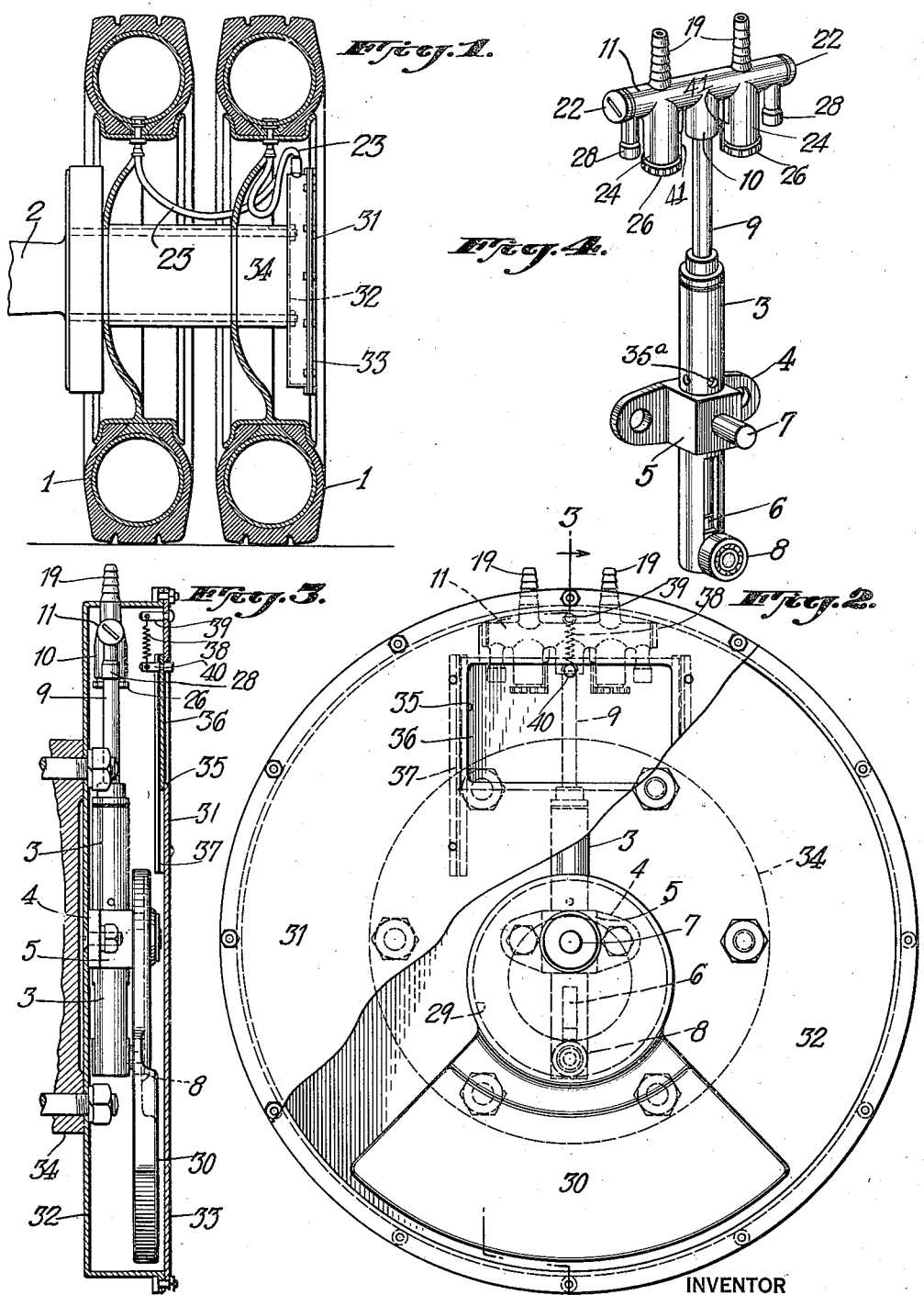
INVENTOR
CLARK W. PARKER.
BY Darby & Darby
ATTORNEYS.

Sept. 23, 1941.                C. W. PARKER                2,256,469
                         DUAL TIRE INFLATOR DEVICE
                    Filed Sept. 1, 1938        2 Sheets-Sheet 2
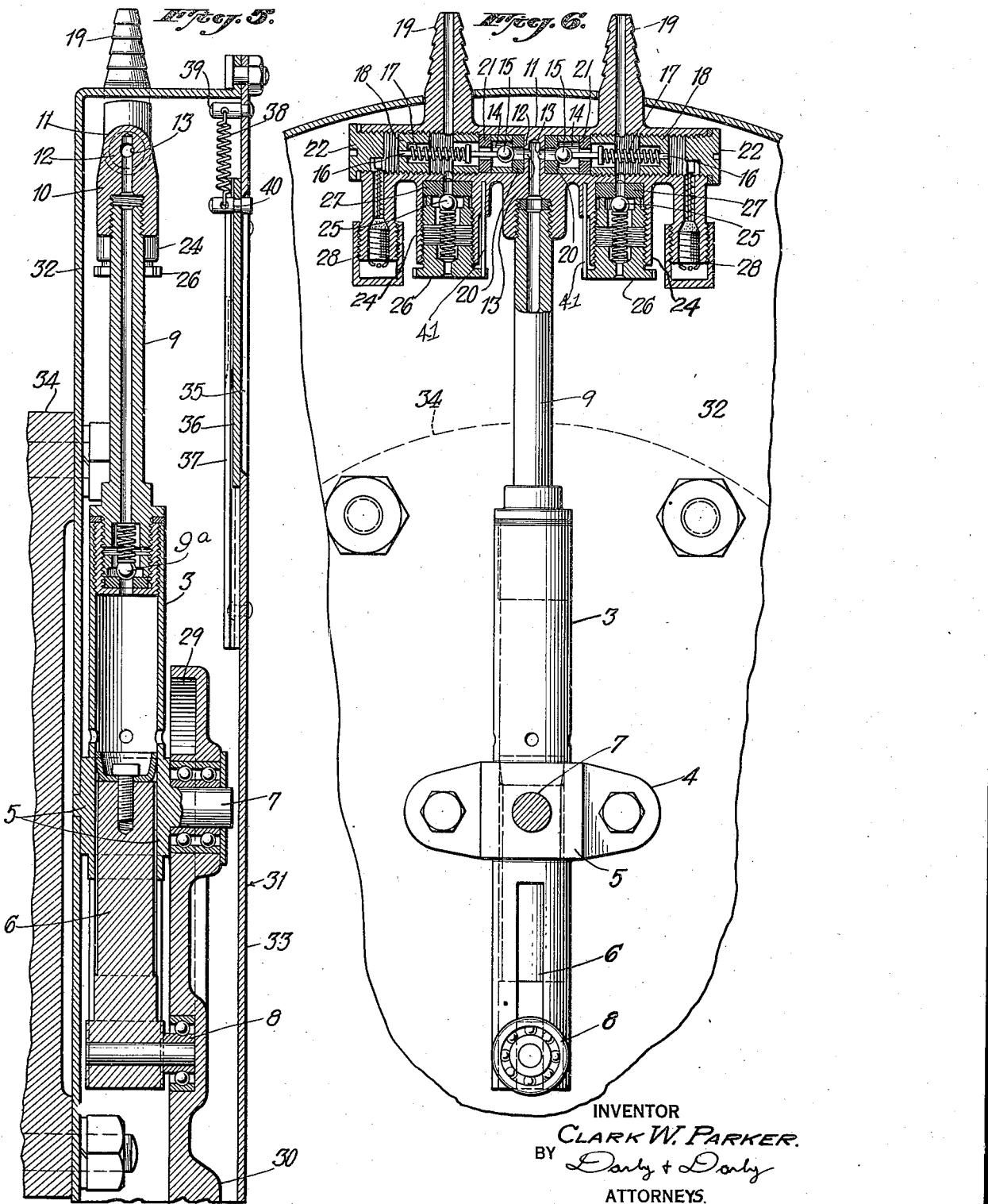
INVENTOR
CLARK W. PARKER.
BY Darby & Darby
ATTORNEYS.

Patented Sept. 23, 1941

2,256,469

UNITED STATES PATENT OFFICE 2,256,469

DUAL TIRE INFLATOR DEVICE

Clark W. Parker, Dobbs Ferry, N. Y.

Application September 1, 1938, Serial No. 227,902

2 Claims. (Cl. 152—418)

This invention relates to a device for inflating dual pneumatic tires for automobiles and especially for inflating the dual tires used on trucks and buses.

The main object of the invention is to provide a device by which dual tires for automobiles or other vehicles may be inflated while the vehicle is being operated and which will also operate to maintain an equal pressure in said dual tires under ordinary conditions.

A further object of the invention is to provide a device for inflating dual pneumatic tires for automobiles or the like, and which will also operate to prevent said tires from collapsing due to a slow leakage or overinflation.

A further object of the invention is to provide a device for inflating dual tires of an automobile or other vehicle which is positioned on a wheel of the vehicle and which is operated by the rotation of said wheel.

Other objects of the invention will be set forth in the following description and drawings and will be pointed out in the appended claims.

In order that my invention may be clearly understood, I have provided drawings wherein Fig. 1 represents a view of two tires in section with the accompanying supporting parts;

Fig. 2 is a view in sectional elevation looking at the face of the rim and showing the arrangement of the parts with parts broken away;

Fig. 3 is a view showing the pumping mechanism in section on the line 3—3 of Fig. 2;

Fig. 4 is a view in perspective of the pump used for inflating the tires;

Fig. 5 is a view on an enlarged scale of the pumping mechanism showing the bottom broken away due to the limitations of the sheet; and Fig. 6 is a view on an enlarged scale of the dual pumping mechanism.

Referring to the drawings, numeral 1 indicates the tires which may be inflated by my pumping mechanism, the wheels or the rims being shown as mounted on a live axle indicated at 2. The tires are inflated from a common pumping mechanism generally indicated at 3; the said pumping mechanism being represented in the remaining figures. The piston of the pumping mechanism is shown connected at 4 to the head or supporting device 5 which carries the piston 6 and is actuated from the pin 7 as an axis which is driven by the piston head 8 which is connected to the piston 6 so as to drive air through the member 9 and into the conduit 10 of the casing in Fig. 5, carrying the several members constituting the valves for inflating the tires. This casing, as shown in Fig. 6, comprises a passage divided, on each side of the center partition, 12, by an aperture 13 leading to a chamber 14, in which a ball valve 15 is located. Engaging the valve 15 is a centralizing stem 16 around which is coiled a spring 17 one end of which engages a collar and the other end rests on the end of the chamber formed in the threaded nut. The casing is also provided with a chamber having a passage through the armored extension 19. Normally the ball valve 15 seats on a rubber member 20 and may also seat on a similar member 21. This end of the passage is plugged as at 22. The spring 17 is just sufficiently strong enough to hold the valve 15 normally against the seat 20 but not strong enough to prevent said valve from becoming unseated when it is subjected to air pressure in an amount exceeding three ounces. The opposite side of the casing is similarly constructed, the two armored stems adapted to be attached to the valve stems by flexible tubing 23. Each pressure chamber is also provided with a regulator consisting its own independent pressure valve a tubular member 24 containing a spring-controlled ball 25 under regulation of an adjustable nut 26. The ball-valve seats on rubber member 27. Outlets 28 are adapted to relieve the tires of air and also to test the pressure of the air in said tires and said outlets may have mounted therein the standard type of valve construction for that purpose (not shown in the drawings) to which the usual gauge device may be applied for testing pressures in the chamber or said gauge valve may be depressed so as to relieve the chambers and the tires of air. They may be closed by standard valve caps. The two stems 19 extend outside the rim or cover.

From this structure it will be seen that air being forced into the tube 9 enters the passage to the chamber 10 and in right and left direction passing the ball valves 15 to their respective chambers and thence to the chambers in communication with the tubular extension 19 of the armored section.

The pump member is actuated by a crank pin entering a ball bearing structure 8 which ball bearing structure travels in an eccentric groove formed in the disc portion 29 of a weight 30. The weight 30 extends in fan shape direction into the rim 31 and remains more or less stationary with very little vibration caused by the eccentricity of the path of the ball bearing structure. The ball bearing structure 8 is held stationary or in the given path of the eccentric groove by the laterally extending pin 7 which forms the axis for the supporting device 5. As will be seen with reference to Fig. 2, the weight 30 carried by the eccentric 29 plays loosely within the chamber in the bottom of the rim and in fact extends almost to the bottom of said rim, as shown in the view in Fig. 2. The rim 31 is secured to a casing member 32, the front plate of which is indicated at 33 and is sufficiently deep as shown to house all the mechanism so far described excepting the armored portions of the valve conduits or stems. The chamber 32 is secured directly to and rotates with the wheel 34 to which it is secured by a plurality of elongated bolts, the securing nuts of which extend into the chamber 35 and are turned and checked on the screw-threaded ends of said bolts. Airholes 35ᵃ are provided in member 3 of the pump to enable it to breathe air. The pumping mechanism shown in Figures 2 to 6 inclusive is the same as that shown in my Patent No. 2,211,935, issued August 20, 1940.

In the operation of the apparatus, as the wheel of the vehicle turns, the piston is caused to reciprocate by the roller 8 traveling in the eccentric groove in weight 30 held in its fixed, or approximately so, position as shown in Figs. 2 and 3. This causes the piston to be reciprocated within its casing 3 and the air driven by the piston is forced through the tube 9 and into the chamber 10 in extension of the tube 9. A check valve 9ᵃ is provided in the connection between the casing and the tubular member 9 which prevents regurgitation of the air backwardly into the valve stem. This causes the air to enter the valved chambers by forcing aside ball valves 15 therein and causing the air to enter the armored members of the casing which extend through the rim and to which are connected the tubular pipes 23 leading to the tire valves.

The casing plate 33 is provided with a window 35 closed by a shutter 36 held in position in a grooved member 37, and spring held in vertical or closed position by the coil spring 38, supported at one end by the ear 39, and at its lower end by projection 40, carried by the shutter. The spring 30 is adapted to hold the shutter 36 in its closed position, and when it is desired to open the window 35, the shutter is forced toward the center of the wheel against the action of said spring 38. Normally this shutter is slightly bowed so as to enable it to hug closely the surroundings of the face plate 33, so as to create a dust-tight connection between the said shutter and face plate 33. This may be modified as convenient to provide for local conditions.

From the foregoing description it will be seen that as the wheel rotates the piston 9 will reciprocate within its cylinder or fixed member 3, and will pump air through the connection 9 to the conduit 10, in the valve casing above the stem. The ball bearing moving in the eccentric path formed in the weight rotates and causes the stationary weight to remain approximately in the one position shown in Figs. 2 and 3, and this reciprocation caused by the eccentric weight pumps air through connection 9, to the chamber in the casing 10, and into the respective chambers 13, with a tendency to displace the balls therein.

If the air pressure in one of the tires should decrease from the desired amount, the pressure in the two tires will be equalized by the pumping of additional air into the tire needing it, by the operation of the piston 9, as the wheel rotates. The tire that has sufficient air pressure in it will be sealed against air entering it by reason of the ball valve 15 of the chamber 13 for said tire being held against its seat 20, and all the air pumped by the piston 9, will thus enter the other tire until the pressure therein is built up to equal the pressure in the other tire.

In case one of the tires should develop a slow leak therein, the same result would occur. The air pressure in the tire which does not have the leak would keep the ball valve 15 of the chamber 13 for said tire seated against its valve seat 20, and thus prevent leakage of air from said tire in which there is no leak. At the same time the rotation of the wheel of the automobile will continue to reciprocate the piston 9 so that it will pump air to the conduit 10, in the valve casing, and said air will continue to be supplied to both tires as usual so that in the filled tire the pressure will be maintained to the desired degree and also so that additional air is supplied to the leaking tire. However, due to the leak in one of the tires the air that is pumped by the piston 9 will to a large extent be forced through the chamber leading to the leaking tire so as to keep it supplied with air despite the leak therein and keep it sufficiently full of air until proper repair can be made to the same.

In case the tire in which a leak occurs becomes totally deflated due to a serious puncture or other defect therein, the air pumped to the valve casing of that tire would cause the valve 15 on the side of the casing which communicates with said deflated tire to be forced away from its seat 20 and cause it to seat against the member or seat 21, and thus will shut off the entrance of any air at all into the deflated tire. This will also permit all of the air being pumped by the piston 9 to be directed into the casing leading to the sound tire, and said air will enable said sound tire to be maintained at a predetermined pressure and the air therein will not escape through the leaking tire.

Having described my invention, what I claim is:

1. In a tire inflating device for dual tires mounted on a single wheel of a vehicle, pumping means for supplying air to said dual tires and being fixedly secured to the wheel upon which said tires are mounted and operated by the rotation of said wheel, a device associated with said pump comprising duplicate mechanisms, one located in the supply line from the pumping means to each tire, each mechanism of said device including a pressure operated valve normally held closed by pressure in the associated tire, but opened to establish communication between the tire and said pump by the pressure created by the pump during its pumping stroke, each said valve having a secondary valve seat against which said valve is closed when the associated tire is deflated, whereby said pump is effective to inflate one of the two tires while the other remains deflated, and an escape valve associated with each mechanism of said device for preventing over-inflation of the associated tire.

2. In a tire inflating device for dual tires mounted on a single wheel of a vehicle, pumping means for supplying air to said dual tires and being fixedly secured to the wheel upon which said dual tires are mounted and operated by the rotation of said wheel, and a device associated with said pumping means comprising duplicate mechanisms, one located in the supply line from the pumping means to each tire, each mechanism of said device including a pressure operated valve normally held closed by pressure in the associated tire, but opened to establish communication between the tire and said pump by the pressure created by the pump during its pumping stroke, each said valve having a secondary valve seat against which said valve is closed by the pressure created by said pump when the associated tire is deflated, whereby said pump is effective to inflate one of the two tires while the other remains deflated.

CLARK W. PARKER.